UNITED STATES PATENT OFFICE.

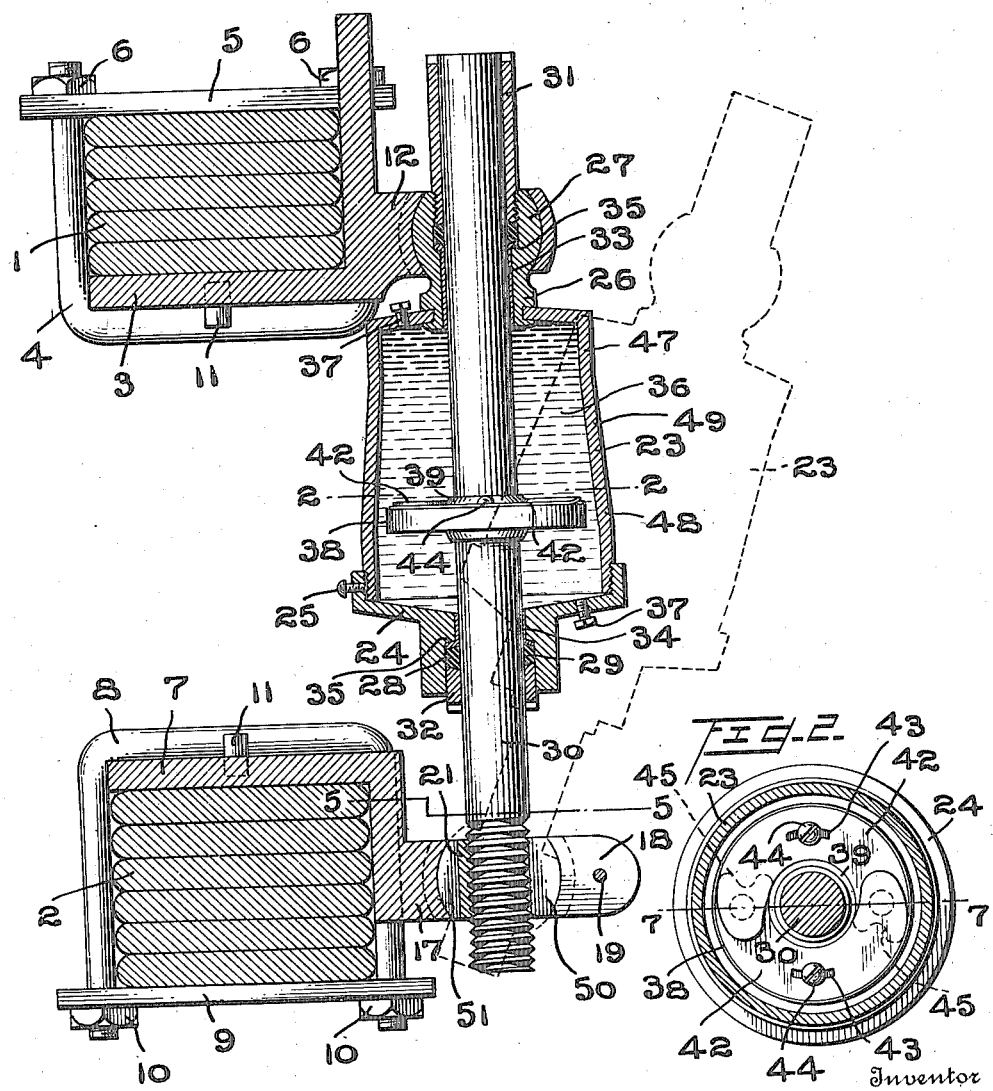

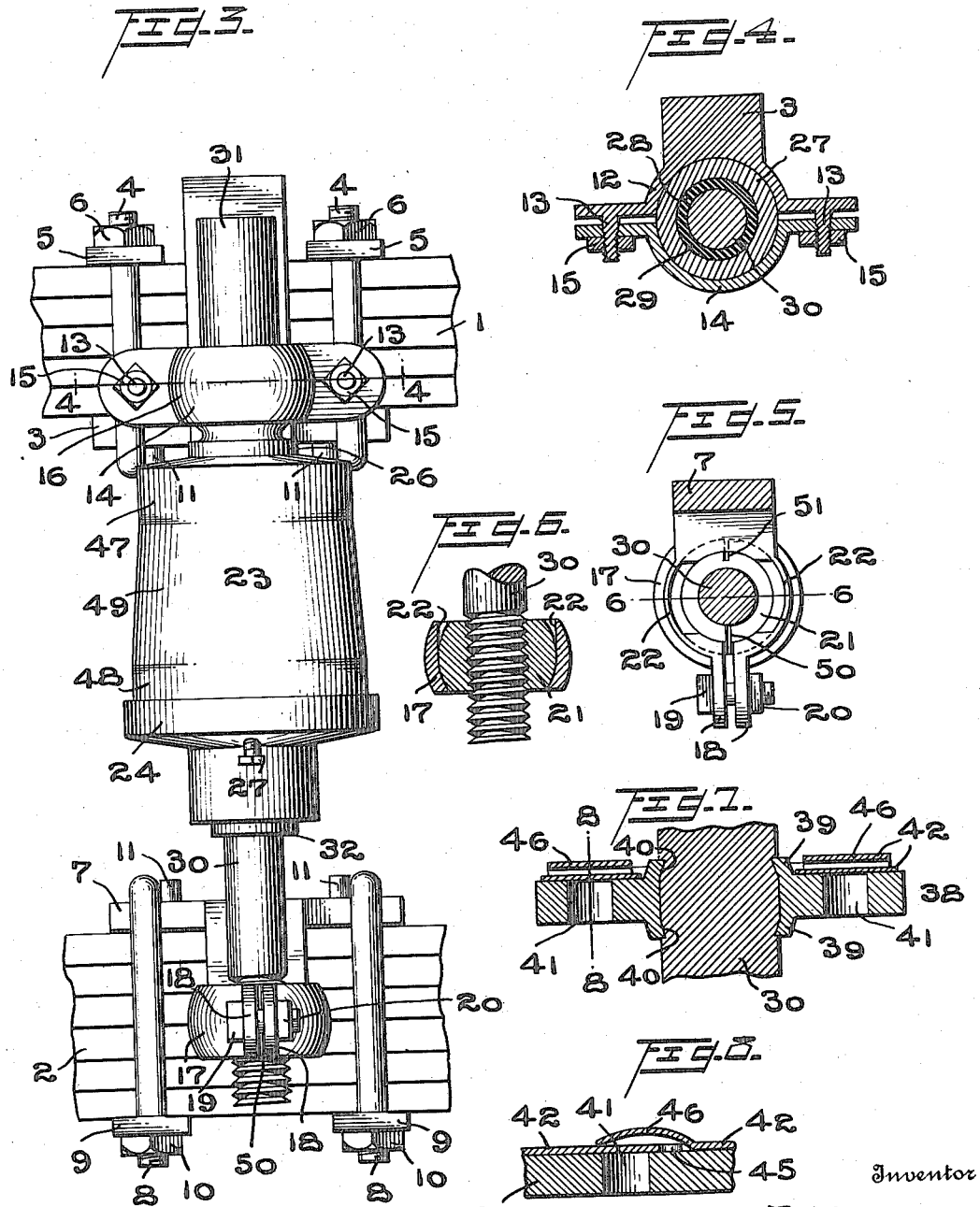

GARIBALDI DE FERNANZO, OF PHILADELPHIA, PENNSYLVANIA.

SHOCK-ABSORBER.

1,137,123.

Specification of Letters Patent. Patented Apr. 27, 1915.

Application filed May 19, 1914. Serial No. 839,492.

*To all whom it may concern:*

Be it known that I, GARIBALDI DE FERNANZO, a citizen of the United States, residing at Philadelphia, in the county of Philadelphia and State of Pennsylvania, have invented certain new and useful Improvements in Shock-Absorbers, of which the following is a specification.

My invention relates to improvements in shock absorbers, the object of the invention being to provide a shock absorber which connects two members of a vehicle, one movable relative to the other, and which prevents sudden jars and jolts, and which also operates to prevent any rebound of the spring, compelling the spring to return slowly to normal position.

A further object is to provide a shock absorber comprising a casing inclosing a piston and filled with fluid, the casing having a portion of its length tapered or in other words of gradually decreasing diameter so as to vary the by-passing of the fluid around the outside of the piston, permitting the quick by-passing of the fluid upon the initial movement, and gradually causing a resistance to said by-passing so as to check the movement.

A further object is to provide an improved mounting for the shock absorber which facilitates the positioning and removal of the same, and which permits an adjustment of the parts to suit conditions.

A further object is to provide a piston with an improved arrangement of valves, and provide improved means for preventing a leakage of the packing due to a pressure of the fluid.

A further object is to improve upon the construction disclosed in my pending application filed April 13, 1914, and given Serial No. 831,361.

With these and other objects in view, the invention consists in certain novel features of construction and combinations and arrangements of parts as will be more fully hereinafter described and pointed out in the claims.

In the accompanying drawings: Figure 1 is a view in vertical section illustrating my improvements in normal position, and showing in dotted lines the position of the shock absorber as it is removed or replaced. Fig. 2 is a view in cross section on the line 2—2 of Fig. 1. Fig. 3 is a view in side elevation at right angles to Fig. 1. Fig. 4 is a view in cross section on the line 4—4 of Fig. 3. Fig. 5 is a view in cross section on the line 5—5 of Fig. 1. Fig. 6 is a view in vertical section on the line 6—6 of Fig. 5. Fig. 7 is a fragmentary view in longitudinal section through the piston rod and piston on an enlarged scale on the line 7—7 of Fig. 2, and Fig. 8 is a fragmentary view in section on the line 8—8 of Fig. 7.

1 and 2 represent supporting members for the respective ends of my improved shock absorber, and while in the present instance I have illustrated these supporting members as constituting the two sections of an elliptical spring, I would have it understood that the invention is not limited to any such use, but may be applied to any supports in which one of the supports is movable relative to the other. An angle bracket 3 is secured to the upper support 1 by means of U-bolts 4 which extend under the horizontal member of the angle bracket, and through transverse bars 5 on the upper edge of the support, said U-bolts having nuts 6 on their ends to clamp the parts together. An angle bracket 7 is secured to the lower support 2 by means of U-bolts 8 which extend over the horizontal member of the angle bracket 7 which is on top of the support, and at their lower ends project through a transverse bar 9 and are secured by nuts 10.

The angle brackets 3 and 7 are preferably provided with studs 11 which project from their surface and bear against the U-bolts, preventing any longitudinal movement of the brackets on their supports. The bracket 3 is provided with an integral half bearing 12 having lugs 13 projecting therefrom, and through a removable half bearing 14. Nuts 15 are screwed onto the lugs and adapted to clamp the two half bearings together forming a spherical socket 16 for a purpose which will hereinafter appear. The lower bracket 7 is provided with a spherical socket 17 which is split at its outer portion and formed with perforated ears 18 to receive a clamping bolt 19 and nut 20. A ball 21 is adapted to fit the socket 17 and move in any direction when in the socket.

The upper and lower faces of the ball 21 are flat and parallel, and the socket is recessed in opposite sides as shown at 22, so that when the ball is turned with its flat sides in a vertical position and registering with the walls of the recesses 22, it can be readily lifted out of the socket.

It will be seen, particularly by reference to Fig. 6, that the recesses 22 extend one half way through the socket, so that the ball has a firm bearing in the socket when in use, and is held against removal except when turned in a vertical position which is an abnormal one.

23 represents a casing having a head 24 screwed onto one end, and secured by a jam screw 25. In the opposite end of the casing 23, a block 26 is secured, preferably by turning or riveting the same as shown. On this block 26, a ball 27 is provided and fits in the socket 16. The ball 27 and the head 24 are provided with stuffing boxes 28 containing packing 29 which is held in place around a piston rod 30 by means of removable glands 31 and 32 respectively, the upper gland is preferably long as shown to inclose the rod when in normal position.

The rod 30 extends entirely through the casing 23, and through metal sleeves 33 and 34 respectively at the opposite ends of the casing. These sleeves 33 and 34 at their outer ends have annular flanges 35 which bear against the packing 29, so that the pressure of the fluid 36 within casing 23 causes these sleeves to tightly engage the packing, expanding the packing and preventing any possibility of leakage around the rod. Furthermore, these sleeves snugly fit the rod and can be replaced to insure a tight bearing whenever desired.

It is to be understood that the casing 23 will be entirely filled with fluid, which may be supplied from either end of the casing through normally plugged inlets 37. I provide two of these inlets because the parts may be reversed under certain conditions. On the rod 30, inside of casing 23, I secure my improved piston 38, preferably in the manner illustrated in detail in Fig. 7, that is, I provide circular flanges 39 on both faces of the piston around the rod and force these flanges into annular grooves 40 in the rod, thereby rigidly fixing the piston and rod together without other attaching means.

The piston 38 is provided with two ports 41 which are normally covered by metal plates 42 constituting valves. These plates 42 are curved concentrically in the arc of a circle. They have curved slots 43 between their ends for the reception of headed screws 44 screwed into the piston to permit adjustment of the plates.

Each plate, at one end, overlaps the other, and as these plates are of spring metal, the overlapping of the plates insures a tight closing of the valves and prevents leakage. The underlying portion of each plate is recessed at its end as shown at 45, and if it is desired to increase the by-pass of liquid, these plates are adjusted so that the recessed end overlaps the opening, allowing a slight opening at all times. The size of this opening can be regulated entirely by the adjusting can be regulated entirely by the adjustment of the plates on the piston. The overlapping ends of the plates are preferably bowed upward slightly as shown at 46 to exert a firm pressure upon the underlying portion over the opening.

The casing 23 is circular in cross section and varies in internal diameter. At one end, usually the upper end, the casing throughout a portion of its length as shown at 47, is of approximately the same internal diameter as the diameter of the piston 38, so that the piston snugly fits this portion of the casing. The casing 23, at its opposite end, throughout a portion of its length, is of appreciably greater internal diameter than the diameter of the piston. This portion of the casing I have given the reference numeral 48. The casing 23, between the portions 47 and 48, gradually increases in diameter as shown clearly at 49. This increase in diameter is exaggerated in the drawing, as in most cases a very slight difference in diameter or a very gradual degree of taper will make a considerable difference in the by-passing of the fluid.

Fig. 1 shows the piston in its normal position, that is, close to its largest diameter. When a sudden downward movement of the spring takes place, the casing 23 will be forced downwardly. As the casing moves downwardly, the by-passing of the fluid is resisted more and more. In other words, the fluid by-passes freely upon the initial movement, and the resistance to such by-passing increases as the piston moves toward the smallest internal diameter of the casing, and is checked entirely by the time the piston reaches the smallest diameter of the casing. The movement of the casing in the opposite direction is facilitated by reason of the fact that the fluid will rush through the ports 41, causing the valves to open, and allowing the parts to return to normal position slowly and without rebound.

By constructing my improvements as above described, the shock absorber can be readily removed and replaced. To remove the shock absorber, the half bearing 14 is taken off, when the parts can be moved to the position shown in dotted lines in Fig. 1. In this position, the rod 30 can be readily unscrewed from ball 21. This ball 21 is split at one side as shown at 50, and recessed at its other side as shown at 51, so that the clamping action of the socket serves to cause the ball to grip the threads of the rod as well as snugly fit within the socket, preventing accidental turning of either the ball or the rod, and insuring a proper arrangement of parts after they have been once adjusted.

As the casing or piston move relative to each other, the fluid exerts a great pressure upon the sleeves 33 and 34, causing these sleeves to compress the packing and insure a tight joint. At any time desired, these sleeves can be replaced by others, so that a tight juncture may be had at all times.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A shock absorber comprising a casing, a rod projecting through the ends of the casing, a piston secured to the rod in the casing, said casing having one cylindrical end portion of a diameter apparently larger than the diameter of the other cylindrical end portion, and the wall of said casing tapering from one cylindrical portion to the other, substantially as described.

2. A shock absorber, comprising a casing, a rod projecting through the casing, a piston fixed to the rod and movable in the casing, said casing having its wall tapered longitudinally, ports in the piston, and spring plates secured to the piston and having their ends overlapping at the ports, substantially as described.

3. A shock absorber, comprising a casing, a rod projecting through the ends of the casing, a piston secured to the rod in the casing, said casing having one cylindrical end portion of a diameter appreciably larger than the diameter of the other cylindrical end portion, and the wall of said casing tapering from one cylindrical portion to the other, ports in the piston, spring plates secured to the piston and having their ends overlapping at the ports, substantially as described.

4. A shock absorber, comprising a casing, a rod projecting through the casing, a piston fixed to the rod and movable in the casing, said casing having its wall tapered longitudinally, ports in the piston, spring plates secured to the piston and having their ends overlapping at the ports, the underlying portions of said plates having recessed ends, substantially as described.

5. A shock absorber, comprising a casing, a rod projecting through the ends of the casing, a piston secured to the rod in the casing, said casing having one cylindrical end portion of a diameter appreciably larger than the diameter of the other cylindrical end portion, and the wall of said casing tapering from one cylindrical portion to the other, ports in the piston, spring plates secured to the piston and having their ends overlapping at the ports, the underlying portions of said plates having recessed ends, substantially as described.

6. A shock absorber, comprising a casing, having a spherical ball on one end, and a removable head at its other end, a rod extending through the casing and projecting through the ball and head, a supporting bracket having a socket thereon, said socket comprising a stationary half bearing and a removable half bearing and adapted to receive the said ball between them, a second support having a socket, a ball in the last-named socket having a screw-threaded opening, said rod having a screw-threaded portion engaging in the opening in the last-mentioned ball, said last-mentioned ball having a split portion, and said last-mentioned socket adapted to clamp the ball and compress the same around the threaded portion of the rod, substantially as described.

7. A shock absorber, comprising a casing, a rod extending through the casing, a piston on the rod in the casing, a bracket having ball and socket juncture with one end of the casing, a second bracket having a socket therein, a ball screwed onto the rod and located in the last-mentioned socket, said ball having parallel upper and lower faces, and said last-mentioned socket having recesses in its sides permitting the removal of the ball therethrough when the said ball is positioned with its flat walls in a vertical position, substantially as described.

In testimony whereof I have signed my name to this specification in the presence of two subscribing witnesses.

GARIBALDI DE FERNANZO.

Witnesses:
M. E. DITTUS,
CHAS. E. POTTS.